US012636694B2

(12) United States Patent
Depot et al.

(10) Patent No.: US 12,636,694 B2
(45) Date of Patent: May 26, 2026

(54) SYSTEMS AND METHODS FOR DEFORMATION CORRECTION OF A GAS TURBINE SHROUD

(71) Applicant: General Electric Company, Schenectady, NY (US)

(72) Inventors: Joshua Depot, Greenville, SC (US); Jacob A. Salm, Greenville, SC (US); Jeremy E. Gard, Greenville, SC (US); Ellison Lenz, Greenville, SC (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 319 days.

(21) Appl. No.: 18/345,536

(22) Filed: Jun. 30, 2023

(65) Prior Publication Data

US 2024/0157424 A1 May 16, 2024

Related U.S. Application Data

(63) Continuation of application No. PCT/US2022/050034, filed on Nov. 16, 2022.

(51) Int. Cl.

| | |
|---|---|
| ***B21D 1/10*** | (2006.01) |
| ***B21D 37/10*** | (2006.01) |
| ***B21D 53/84*** | (2006.01) |
| *F01D 25/24* | (2006.01) |

(52) U.S. Cl.
CPC ............... *B21D 1/10* (2013.01); *B21D 37/10* (2013.01); *B21D 53/84* (2013.01); *F01D 25/24* (2013.01); *F05D 2230/20* (2013.01)

(58) Field of Classification Search
CPC ... B21D 1/06; B21D 1/10; B21D 3/16; B21D 37/10; B21D 53/84
See application file for complete search history.

(56) References Cited

U.S. PATENT DOCUMENTS

| | | | | |
|---|---|---|---|---|
| 3,621,700 | A | 11/1971 | Wachtell et al. | |
| 6,129,261 | A * | 10/2000 | Sanders | B21D 26/055 228/157 |
| 6,938,447 | B2 | 9/2005 | Fuse et al. | |
| 11,292,220 | B2 | 4/2022 | Liu et al. | |
| 2004/0035163 | A1 | 2/2004 | Fuse et al. | |
| 2015/0300184 | A1 | 10/2015 | Zebec et al. | |

OTHER PUBLICATIONS

International Search Report and Written Opinion, PCT/US2022/050034, dated Feb. 8, 2023 (7 pp.).

* cited by examiner

*Primary Examiner* — Teresa M Ekiert
(74) *Attorney, Agent, or Firm* — Eversheds Sutherland (US) LLP

(57) ABSTRACT

The present application provides a deformation correction system for a hot gas path surface of a turbine shroud. The deformation correction system may include a first die having a curved surface and a second die such that the hot gas path surface of the turbine shroud is positioned between the first die and the second die.

13 Claims, 5 Drawing Sheets

SYSTEMS AND METHODS FOR DEFORMATION CORRECTION OF A GAS TURBINE SHROUD

CROSS-REFERENCE TO RELATED APPLICATIONS

This application claims priority pursuant to 35 U.S.C. 119(a) to PCT International Application No. PCT/US2022/050034, filed Nov. 16, 2022, which application is incorporated herein by reference in its entirety.

TECHNICAL FIELD

The present application and the resultant patent relate generally to gas turbine engines and more particularly relate to systems and methods for correcting deformation of a hot gas path surface of a turbine shroud for an improved and extended overall lifetime.

BACKGROUND

A gas turbine engine conventionally includes a compressor for compressing ambient air and a combustor for mixing the air with fuel to generate hot combustion gases. A turbine receives the hot combustion gases and extracts energy therefrom for powering the compressor and producing output power for an electrical generator and the like. The turbine conventionally includes one or more stages of stationary stator vanes, rotating rotor blades, and annular shrouds surrounding the components therein. Gas turbine efficiency and reliability are impacted by the clearances maintained between the stationary and the rotating hardware. Tighter clearances produce higher efficiencies, but also increase the likelihood of damage from rubbing and the like. For example, certain turbine components such as turbine shrouds, exhibited inboard deformation in a localized area of the hot gas path, beyond allowable deflection limits. Although the deformation may be minor, correction of such may improve overall system efficiency and component lifetime.

SUMMARY

The present application and the resultant patent provide a deformation correction system for a hot gas path surface of a turbine shroud. The deformation correction system may include a first die having a curved surface and a second die such that the hot gas path surface of the turbine shroud is positioned between the first die and the second die.

The present application and the resultant patent further provide a method of correcting a deformation in a hot gas path surface of a turbine shroud. The method may include the steps of placing the turbine shroud on a lower die, placing a positioning template about the hot gas path surface of the turbine shroud, positioning a upper die with a curved surface about the deformation in the hot gas path surface of the turbine shroud, and pressing the first die into the deformation in the hot gas path surface of the turbine shroud.

The present application and the resultant patent further provide a deformation correction system for a hot gas path surface of a turbine shroud. The deformation correction system may include a press, an upper die having a curved surface, and a lower die having a flat surface such that the press presses the upper die into the hot gas path surface of the turbine shroud.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
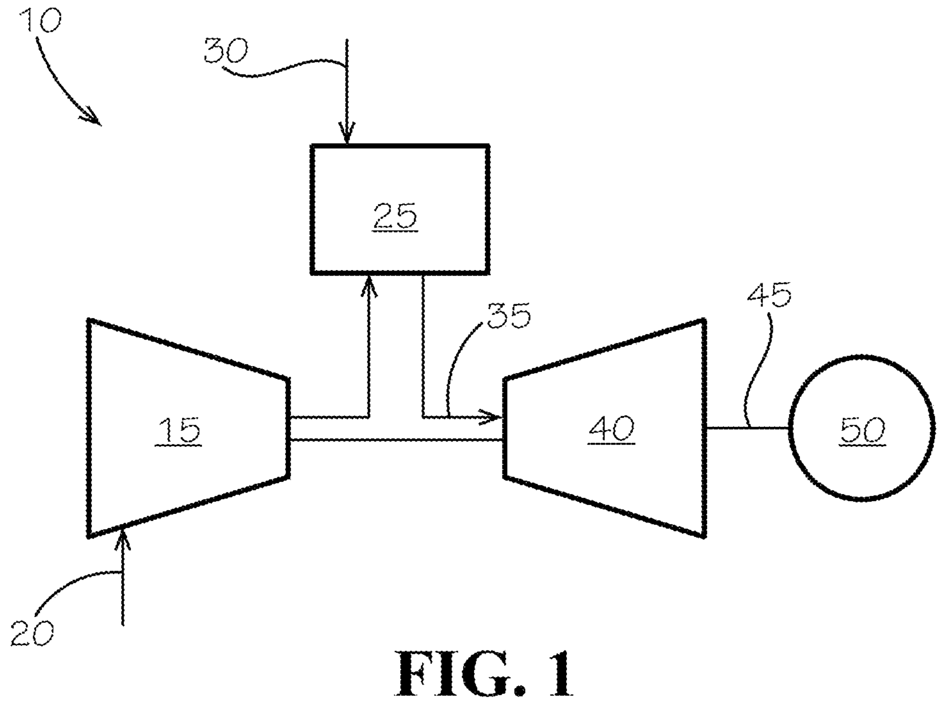
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 so as to produce mechanical work. The mechanical work produced in the turbine 40 drives the compressor 15 via a rotor shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like and may be part of a simple cycle or a combined cycle power generation system. The gas turbine engine 10 may have different configurations and may use other types of components. Other types of gas turbine engines also may be used herein. Multiple gas turbine engines, other types of turbines, and other types of power generation equipment also may be used herein together.

Figure 2:
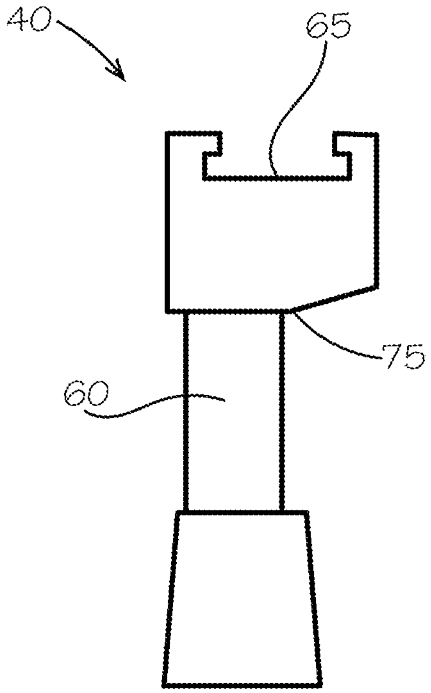
FIG. 2 is a schematic diagram of a rotor blade and an adjacent turbine shroud.

As is shown in FIG. 2, the turbine 40 includes a number of stationary stator vanes (not shown) and a number of rotating rotor blades 60 arranged in stages. The rotor blades 60 rotate within a turbine shroud 65. The turbine shroud 65 may be concentric and may be supported by an outer casing (not shown). Within the turbine 40, a portion of the kinetic energy of the hot combustion gases 35 is transferred to the rotor blades 60 and is converted to mechanical work. A blade tip clearance 70 is desired between the tips of the rotor blades 60 and the turbine shroud 65. Over time, the hot combustion gases 35 may deform the surface of the turbine shroud 65 such that the dimensions of the blade tip clearance 70 may be altered so as to have an impact on overall efficiency and/or lead to rubbing or other types of mechanical contact.

Figure 3:
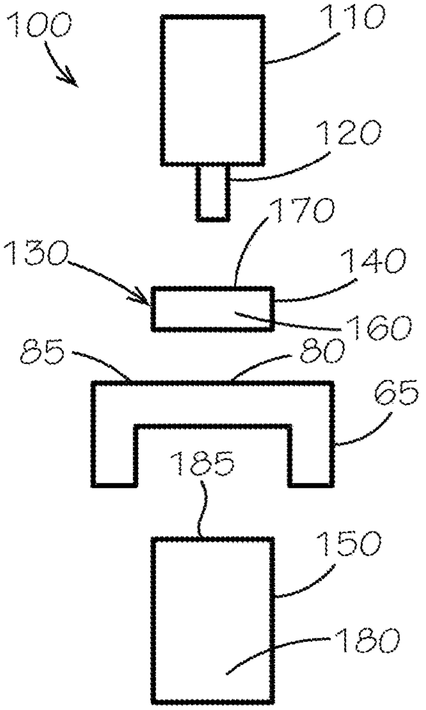
FIG. 3 is a schematic diagram of an exemplary turbine shroud deformation correction system as may be described herein.
Figure 3A:
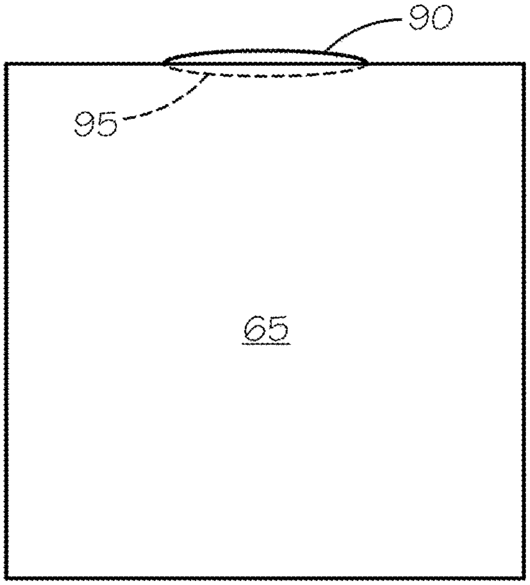
FIG. 3A is a schematic diagram of an exemplary turbine shroud having a deformation therein.

FIG. 3 and FIG. 3A shows schematic views of an exemplary turbine shroud deformation correction system 100 and a turbine shroud 65 as may be described herein. Generally described, the turbine shroud deformation correction system 100 may reduce a deformation 80 in a hot gas path surface 85 of the turbine shroud 65. The deformation 80 may be a bulge 90, i.e., an outward or convex deformation, or a depression 95, i.e., an inward or concave deformation with respect to the engine centerline. The deformation 80 may be positioned anywhere along the hot gas path surface 85.

The turbine shroud deformation correction system 100 may include a press 110. The press 110 may be an industrial hydraulic press, a mechanical press, and the like of conventional design and application pressure. The press 110 may include a piston rod 120 and the like for applying pressure to a work piece.

The turbine shroud deformation correction system 100 may include one or more dies 130. In this example, a first or an upper die 140 and a second or a lower die 150 may be used with the turbine shroud 65 positioned therebetween. The relative position of the dies 130 may vary. The upper die 140 may be in the form of a curved surface 160 with a curvature to match the curvature of the hot gas path. Specifically, the curved surface 160 be convex or concave as desired. Alternatively, a substantially flat surface may be used herein. The upper die 140 may have a detent 170 thereon sized to accommodate the piston rod 120. The lower die 150 may be in the form of a block 180 with a flat surface 185 thereon. Alternatively, a concave or a convex curved surface also may be used herein on the block 180. The dies 130 may be made out of A6 tool steel and the like for high yield strength and hardness. Other types of materials may be used herein. Specific sets of dies 130 may be dedicated to specific turbine shroud designs and variations thereof. Other components and other configurations may be used herein.

Figure 4:
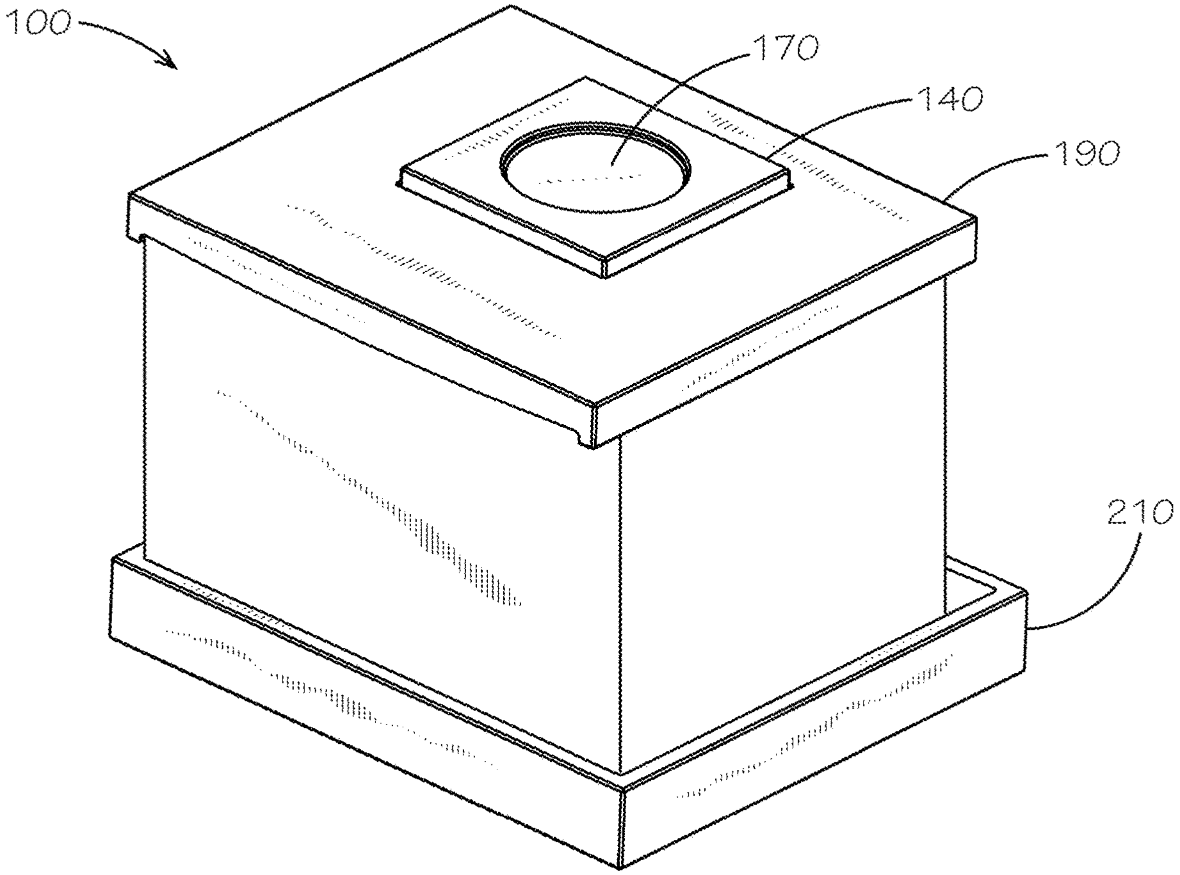
FIG. 4 is a perspective view of a turbine shroud and components of the turbine shroud deformation correction system of FIG. 3.
Figure 5:
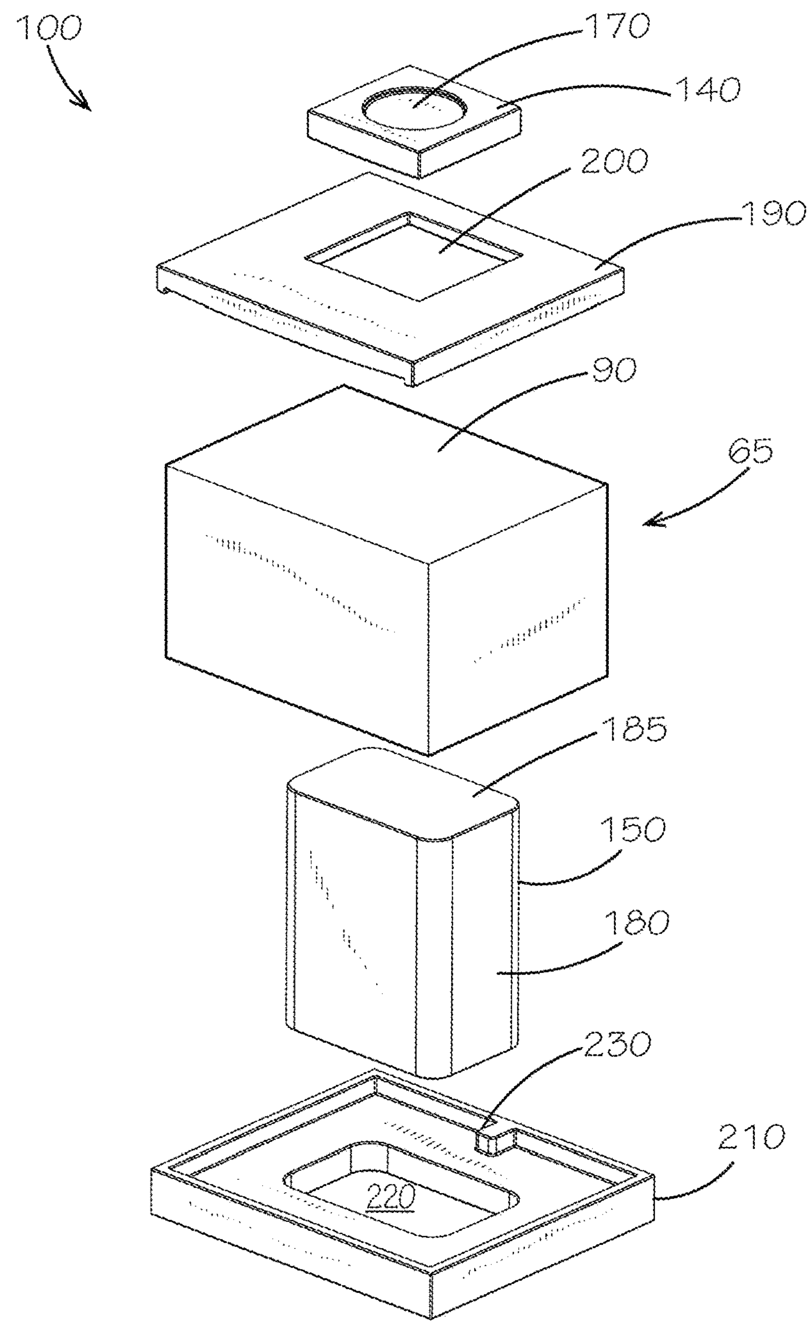
FIG. 5 is an exploded view of the turbine shroud and the components of the turbine shroud deformation correction system of FIG. 4.
Figure 6:
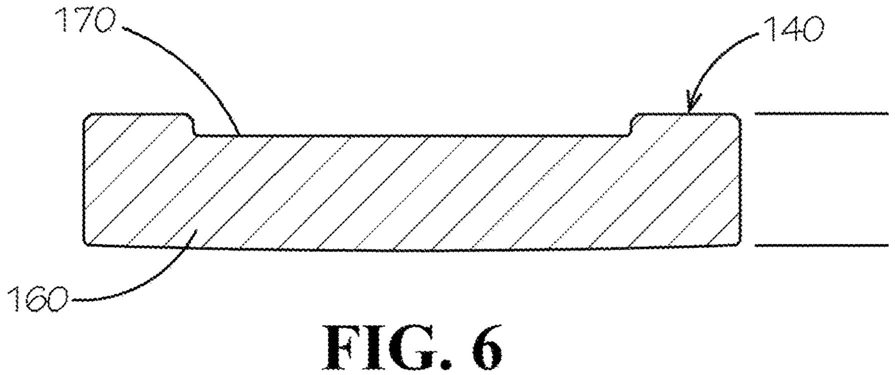
FIG. 6 is a sectional view of a die of the turbine shroud deformation correction system of FIG. 4.

FIGS. 4-6 show a further embodiment of the turbine shroud deformation correction system 100 as may be described herein. In this example, the deformation 80 in the hot gas path surface 85 may be the bulge 90 (i.e., an outward or convex deformation with respect to the engine centerline). The upper die 140 may be in the form of the curved surface 160 and the lower die 150 may be in the form of the block 180 with the flat surface 185 thereon. Other types of surfaces may be used herein. The upper die 140 may be positioned via a positioning template 190 located on the turbine shroud 65. The positioning template 190 has an upper die opening 200 therein sized for the upper die 140. The positioning template 190 properly and consistently located the upper die 140 with respect to the turbine shroud 65. Likewise, the use of the detent 170 on the upper die 140 ensures a substantially uniform distribution of force from the press 110.

The turbine shroud 65 may be uniformly positioned with respect to the lower die 150 via a lower die holder 210. Specifically, the turbine shroud 65 may be positioned within the lower die holder 210. The lower die holder 210 may have a lower die opening 220 sized for the lower die 150. The lower die holder 210 also may have a location feature 230 formed therein. The size and shape of the location feature 230 may match that of an anti-rotation pin slot (not shown) in the turbine shroud 65. Other types of location features may be used herein. Aligning the location feature 230 and, e.g., the anti-rotation pin slot ensures proper positioning of the turbine shroud 65 with respect to the lower die holder 210 and the lower die 150. Other components and other configurations may be used herein.

In use, the turbine shroud 65 is lowered onto the lower die 150 and into position within the lower die holder 210. Specifically, the turbine shroud 65 is positioned about the lower die holder 210 via the location feature 230 while the lower die 150 is located in the lower die opening 220. The lower die holder 210 thus ensures that the turbine shroud 65 is properly positioned each time. The upper die 140 then may be positioned via the positioning template 190 over the hot gas path surface 85 of the turbine shroud 65 that exhibited deformation. The piston rod 120 from the press 110 is then aligned with the detent 170 in the upper die 140 to ensure a full and equal dispersion of the force applied to the deformation 80. The use of the curved surface 160 that mimics the shape of the hot gas path as the upper die 140 thus may return the hot gas path surface 85 of the turbine shroud 65 substantially to its originally designed geometry.

Figure 7:
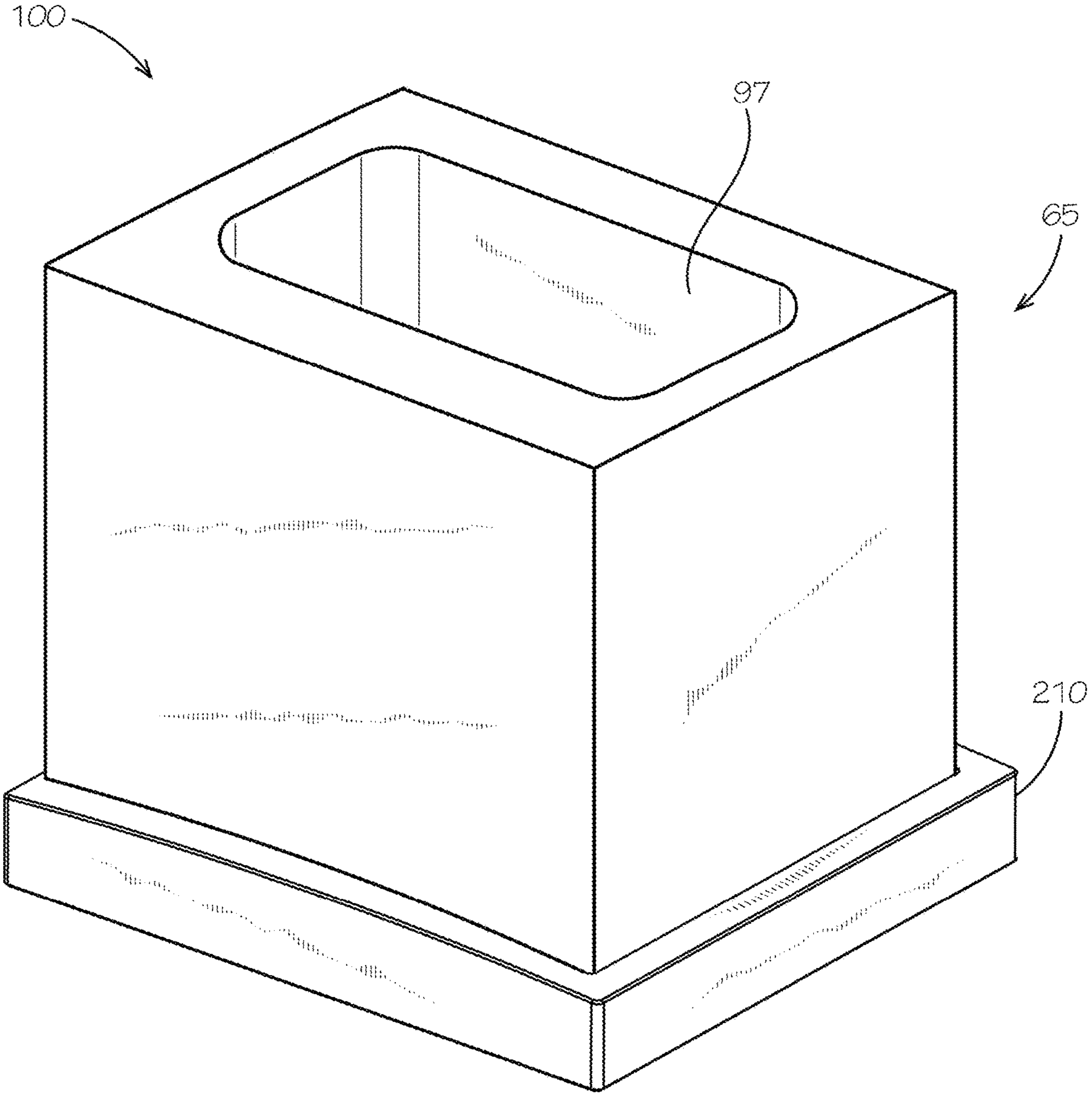
FIG. 7 is a perspective view of a turbine shroud and an alternative embodiment of the components of the turbine shroud deformation correction system of FIG. 3.
Figure 8:
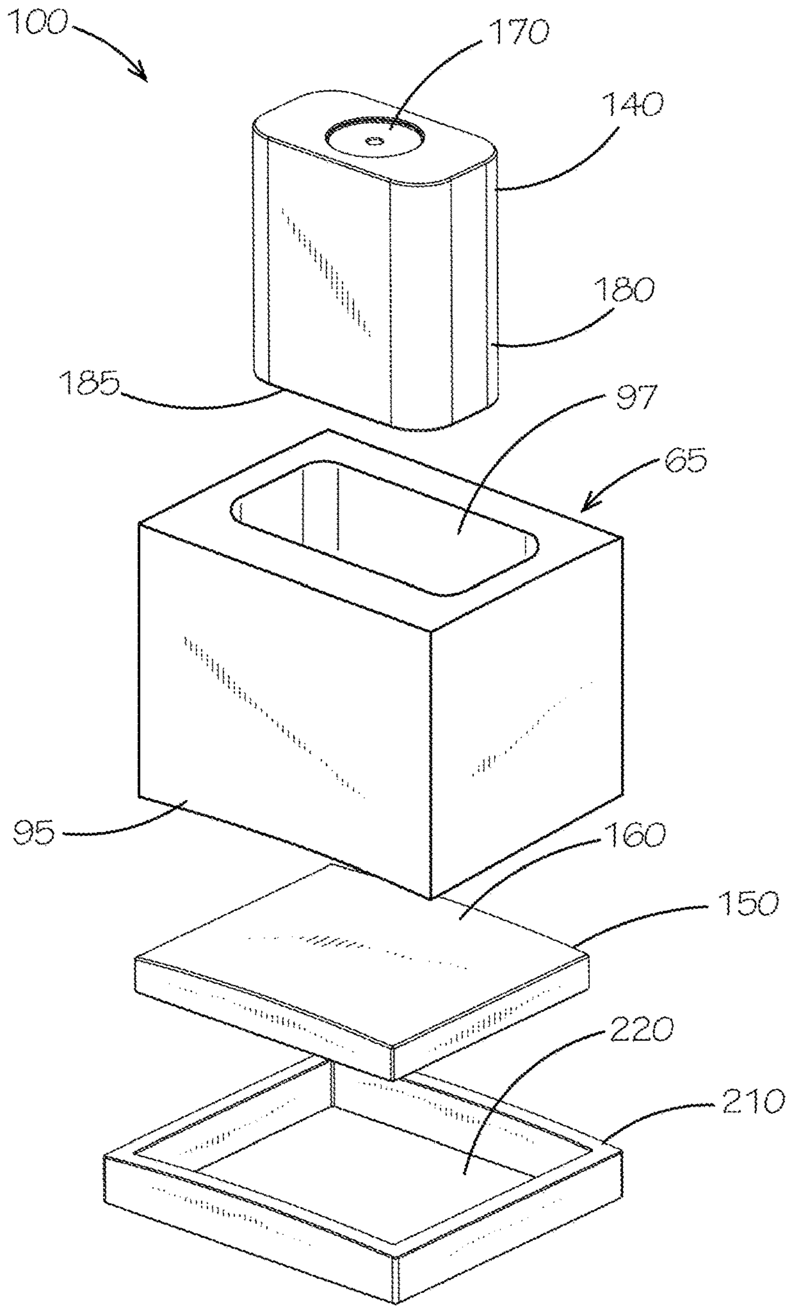
FIG. 8 is an exploded view of the turbine shroud and the components of the turbine shroud deformation correction system of FIG. 7.
Figure 9:
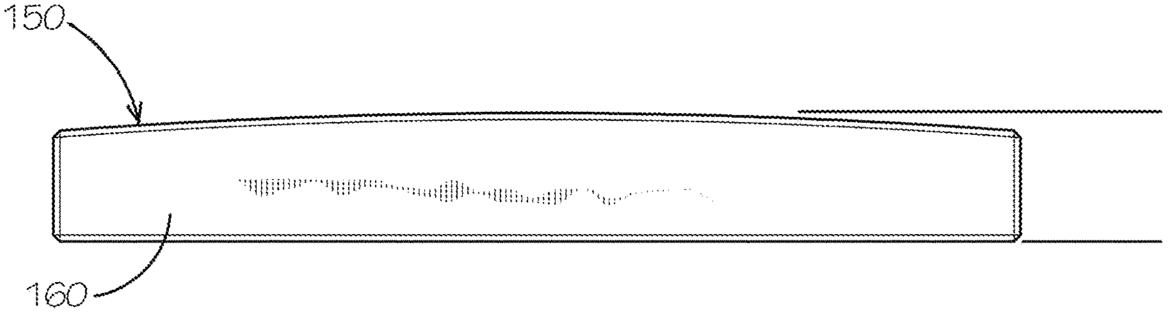
FIG. 9 is a sectional view of a die of the turbine shroud deformation correction system of FIG. 7.

FIGS. 7-9 show a further embodiment of the turbine shroud deformation correction system 100 as may be described herein. In this example, the deformation 80 in the hot gas path surface 85 may be the depression 95 (i.e., an inward or concave deformation with respect to the engine centerline). The components in this embodiment are largely arranged in the reverse of that described above. Given such, the turbine shroud 65 may be positioned upside down (with respect to the above) with a turbine shroud aperture 97 on an upper side and the hot gas path surface 85 on a lower side.

In this example, the upper die 140 may be in the form of the block 180 with the flat surface 185. The upper die 140 may have the detent 170 formed therein for the piston rod 120 of the press 110. The lower die 150 may be in the form of the curved surface 160. The curved surface 160 may be positioned within the lower die holder 210. The upper die 140 in the form of the block 180 with the flat surface 185 contacts the hot gas path surface 85 of the turbine shroud 65 and applies pressure thereto. The use of the curved surface 160 that mimics the shape of the hot gas path as the lower die 150 thus may return the hot gas path surface 85 of the turbine shroud 65 substantially to its originally designed geometry. Other components and other configurations may be used herein.

The turbine shroud deformation correction system 100 thus corrects the deformation 80 in the hot gas path surface 85 of the turbine shroud 65. Specifically, the turbine shroud deformation correction system 100 use the shape and configuration of the dies 130 to mechanically re-contour the distorted geometry of the turbine shroud 65. The deformation correction described herein may be performed at room temperatures or at elevated temperatures. The geometry of the hot gas path surface 85 of the turbine shroud 65 thus may be properly restored to acceptable operating conditions for additional hot gas path intervals.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A deformation correction system for a hot gas path surface of a turbine shroud, including a first die; the first die comprising a curved surface; and a second die; the second die comprising a flat surface; wherein the hot gas path surface of the turbine shroud is positioned between the first die and the second die.
2. The deformation correction system of clause 1, further comprising a press in communication with the first die.
3. The deformation correction system of any preceding clause, wherein the press comprises a piston rod and wherein the first die comprises a detent sized to accommodate the piston rod.
4. The deformation correction system of any preceding claim, wherein the second die comprising a flat surface.
5. The deformation correction system of any preceding clause, wherein the hot gas path surface comprises a bulge and wherein the first die comprises an upper die.
6. The deformation correction system of any preceding clause, further comprising a positioning template positioned about the hot gas path surface of the turbine shroud.
7. The deformation correction system of any preceding clause, wherein the positioning template comprises an upper die opening sized to accommodate the upper die.
8. The deformation corrections system of any preceding clause, wherein the second die comprises a lower die.
9. The deformation correction system of any preceding clause, further comprising a lower die holder sized to accommodate the turbine shroud.
10. The deformation correction system of any preceding clause, wherein the lower die holder comprises a location feature.
11. The deformation correction system of any preceding clause, wherein the lower die holder comprises a lower die opening sized to accommodate the lower die.
12. The deformation correction system of any preceding clause, wherein the hot gas path surface comprises a depression and wherein the first die comprises a lower die.
13. The deformation correction system of any preceding clause, further comprising a lower die holder sized to accommodate the lower die.
14. The deformation correction system of any preceding clause, wherein the second die comprises an upper die.
15. A method of correcting a deformation in a hot gas path surface of a turbine shroud, comprising placing the turbine shroud on a lower die; placing a positioning template about the hot gas path surface of the turbine shroud; positioning an upper die with a curved surface about the deformation in the hot gas path surface of the turbine shroud; and pressing the upper die into the deformation in the hot gas path surface of the turbine shroud.
16. A deformation correction system for a hot gas path surface of a turbine shroud, comprising a press; an upper die; the upper die comprising a curved surface; and a lower die; the lower die comprising a flat surface; wherein the press presses the upper die into the hot gas path surface of the turbine shroud.
17. The deformation correction system of any preceding clause, wherein the press comprises a piston rod and wherein the upper die comprises a detent sized to accommodate the piston rod.
18. The deformation correction system of any preceding clause, further comprising a positioning template positioned about the hot gas path surface of the turbine shroud.
19. The deformation correction system of any preceding clause, wherein the positioning template comprises an upper die opening sized to accommodate the upper die.
20. The deformation correction system of any preceding clause, further comprising a lower die holder with a lower die opening sized to accommodate the lower die.

We claim:

1. A deformation correction system for a hot gas path surface of a turbine shroud, wherein the hot gas path surface has a bulge, the deformation correction system comprising:

an upper die;

the upper die comprising a curved surface;

a second die;

wherein the hot gas path surface of the turbine shroud is positioned between the upper die and the second die; and a positioning template positioned about the hot gas path surface of the turbine shroud;

wherein the positioning template comprises an upper die opening sized to accommodate the upper die.

2. The deformation correction system of claim 1, further comprising a press in communication with the upper die.

3. The deformation correction system of claim 2, wherein the press comprises a piston rod and wherein the upper die comprises a detent sized to accommodate the piston rod.

4. The deformation correction system of claim 1, wherein the second die comprising a flat surface.

5. The deformation corrections system of claim 1, wherein the second die comprises a lower die.

6. The deformation correction system of claim 5, further comprising a lower die holder sized to accommodate the turbine shroud.

7. The deformation correction system of claim 6, wherein the lower die holder comprises a location feature.

8. The deformation correction system of claim 6, wherein the lower die holder comprises a lower die opening sized to accommodate the lower die.

9. A deformation correction system for a hot gas path surface of a turbine shroud, wherein the hot gas path surface has a depression, the deformation correction system comprising:

a lower die;

the lower die comprising a flat surface;

a second die;

wherein the hot gas path surface of the turbine shroud is positioned between the lower die and the second die; and a lower die holder sized to accommodate the lower die;

wherein the lower die holder comprises a location feature; and wherein the lower die holder comprises a lower die opening sized to accommodate the lower die.

10. The deformation correction system of claim 9, wherein the second die comprises an upper die.

11. A deformation correction system for a hot gas path surface of a turbine shroud, comprising:

a press;

an upper die;
the upper die comprising a curved surface;
a lower die;
the lower die comprising a flat surface;
wherein the press presses the upper die into the hot gas path surface of the turbine shroud; and
a positioning template positioned about the hot gas path surface of the turbine shroud;
wherein the positioning template comprises an upper die opening sized to accommodate the upper die.

12. The deformation correction system of claim 11, wherein the press comprises a piston rod and wherein the upper die comprises a detent sized to accommodate the piston rod.

13. The deformation correction system of claim 11, further comprising a lower die holder with a lower die opening sized to accommodate the lower die.

* * * * *